(12) United States Patent
Sullivan et al.

(10) Patent No.: US 7,857,566 B2
(45) Date of Patent: *Dec. 28, 2010

(54) REACTIVE FASTENERS

(75) Inventors: Paul Sullivan, Humble, TX (US);
Rafael Munoz, Houston, TX (US)

(73) Assignee: Reactive Spring Fasteners, LLC,
Humble, TX (US)

( * ) Notice: Subject to any disclaimer, the term of this patent is extended or adjusted under 35 U.S.C. 154(b) by 761 days.

This patent is subject to a terminal disclaimer.

(21) Appl. No.: 11/550,491

(22) Filed: Oct. 18, 2006

(65) Prior Publication Data

US 2007/0086874 A1    Apr. 19, 2007

Related U.S. Application Data

(63) Continuation-in-part of application No. 11/181,312, filed on Jul. 14, 2005, now Pat. No. 7,462,007.

(51) Int. Cl.
*F16B 39/24* (2006.01)

(52) U.S. Cl. ........................ 411/155; 411/544; 29/446

(58) Field of Classification Search .............. 411/155, 411/198, 990, 204, 943, 260, 261, 349, 544, 411/549, 372, 368, 370, 371.2, 929.2; 29/446; 81/124.5, 125
See application file for complete search history.

(56) References Cited

U.S. PATENT DOCUMENTS

| | | | |
|---|---|---|---|
| 181,716 A | | 8/1876 | Pickles |
| 462,643 A | * | 11/1891 | Kildoyle ..................... 411/231 |
| 730,880 A | * | 6/1903 | Cook ......................... 411/155 |
| 845,250 A | | 2/1907 | Newman |
| 1,391,378 A | * | 9/1921 | Gaston ....................... 411/155 |
| 1,911,384 A | * | 5/1933 | Olson ........................ 411/155 |
| 3,233,262 A | | 2/1966 | Vollman |
| 3,469,490 A | * | 9/1969 | Pearce, Jr. ................. 411/371.1 |
| 3,628,584 A | | 12/1971 | Gutshall |
| 3,631,910 A | | 1/1972 | Crowther |
| 3,633,446 A | * | 1/1972 | Tadahira et al. ............ 81/57.46 |
| 3,823,526 A | | 7/1974 | Rose |
| 3,909,927 A | * | 10/1975 | Steward ................... 29/525.02 |
| 3,913,649 A | | 10/1975 | Stanaitis |
| 3,915,056 A | | 10/1975 | Johnson |

(Continued)

OTHER PUBLICATIONS www.Hytorc.com, Makers of multipro-reactive Fasteners.

*Primary Examiner*—Gary Estremsky
(74) *Attorney, Agent, or Firm*—Leyendecker & Lemire, LLC; Kurt P. Leyendecker

(57) ABSTRACT

Several embodiments of reactive biasing fasteners are described. The fasteners are utilized in place of jam nuts and Belleville washers providing for the storage of a pre-load and effectively providing a locking function to prevent unintended loosening of an associated bolt. The embodiments resiliently deform under load to store pre-load or live load energy. Further, the fasteners provide a means for interfacing with a self-reacting tightening power tool thereby eliminating or minimizing the need for reaction arms. Additionally, several embodiments through the incorporation of a threaded bore effectively act to create a substantially torsionless live load on the portion of a bolt located in the bolt hole of a workpiece when in use. The resilient deformation of the biasing fasteners permits the live load to be stored therein and accordingly lessens the risk of loosening of the bolted joint due to exteriorly applied forces such as but not limited to vibration and thermal expansion and contraction.

12 Claims, 12 Drawing Sheets

U.S. PATENT DOCUMENTS

| | | | | |
|---|---|---|---|---|
| 4,031,936 A | | 6/1977 | Curtis | |
| 4,043,369 A | | 8/1977 | Abernethy | |
| 4,362,449 A | * | 12/1982 | Hlinsky | 411/156 |
| 4,409,934 A | | 10/1983 | Kaindl | |
| 4,431,353 A | | 2/1984 | Capuano | |
| 4,715,756 A | | 12/1987 | Danico | |
| 4,930,962 A | | 6/1990 | Reynolds | |
| 4,940,377 A | | 7/1990 | Reynolds | |
| 4,958,970 A | | 9/1990 | Rose | |
| 5,017,079 A | | 5/1991 | Rose | |
| 5,049,017 A | | 9/1991 | Reynolds | |
| 5,056,975 A | * | 10/1991 | Ando | 411/155 |
| 5,085,550 A | * | 2/1992 | Kendrick | 411/432 |
| 5,606,753 A | | 3/1997 | Hashimoto | |
| 5,700,121 A | | 12/1997 | Minola | |
| 5,904,460 A | | 5/1999 | Kawabata | |
| 5,915,902 A | | 6/1999 | Patterson et al. | |
| 6,171,039 B1 | * | 1/2001 | Seurujarvi | 411/148 |
| 6,349,625 B1 | | 2/2002 | Poganski | |
| 6,490,952 B2 | | 12/2002 | Junkers | |
| 7,188,552 B1 | * | 3/2007 | Koppenhoefer | 81/125 |
| 2001/0039858 A1 | * | 11/2001 | Junkers | 81/57.39 |
| 2004/0131445 A1 | | 7/2004 | Kjellberg | |

* cited by examiner

REACTIVE FASTENERS

REFERENCE TO RELATED APPLICATIONS

This application is a continuation in part to patent application Ser. No. 11/181,312, filed on Jul. 14, 2005 now U.S. Pat. No. 7,462,007.

FIELD OF THE INVENTION

This invention generally relates to fasteners and bolted assemblies.

BACKGROUND

Hex nuts and bolts are used in numerous applications to hold together temporary and permanent workpiece constructions. A bolt is a shaft with a helical groove on its surface, called the "thread." A workpiece is an item that requires immobility with respect to another item, typically another workpiece. To ensure a stable workpiece, the bolt is placed through a hole in the workpiece. The workpiece hole may be threaded with a complimentary helix to mate with the bolt. Otherwise, the workpiece hole is not threaded.

Whether the workpiece hole is threaded or not threaded, the bolt must be held in place. Typically, this is done through a bolt head and a nut. The bolt head is attached to one end of the bolt. The nut is an object containing a hole with a complimentary threaded helix to mate with the bolt. Both the bolt head and nut are wider than the bolt shaft, preventing each from falling into the workpiece hole. Alternatively, two nuts are used to hold the bolt in place. Either way, both bolt head and nut must be shaped in order to allow for tightening to keep the workpiece assembly in place. Standard nuts and bolt heads typically have hexagonal shapes. An additional bolt type is a socket head bolt, or an "Allen™" head bolt. Socket head bolt heads are also wider than the bolt shaft but instead of being hexagonal in shape, are typically circular in shape and contain a recess which is hexagonal in shape. Socket head bolts perform functions interchangeable with standard bolts.

Tightening occurs by applying torque to the nut so that the nut turns along the bolt shaft until the nut reaches the workpiece assembly, thus creating a bolted workpiece assembly. Upon reaching the workpiece, additional tightening of the nut induces a tensile load in the associated bolt. This tensile load is often referred to as pre-load, or live load. Pre-load increases the integrity of the workpiece assembly's bolted joint.

Tightening of some workpiece assemblies requires use of devices such as a reaction arm or back-up wrench. Reaction arms are devices coupled or integrated to a tightening tool, extending outwardly from the tightening tool in a manner adapted ensure the tightening tool does not rotate upon tightening. Back-up wrenches perform essentially the same function, ensuring the bolt head or nut does not turn upon tightening. Both reaction arms and back-up wrenches prevent rotation by bracing on a surface proximal the bolted assembly. For example, a back-up wrench may brace on a surface such as, but not limited to, an adjacent nut and a reaction arm may pivot on a surface such as, but not limited to, a portion of the workpiece. As the devices must react against a surface to keep their respective portions of the bolted assembly from rotating, the devices are potentially dangerous in that a person's fingers or clothing may get caught between the device and the bracing point.

Additionally, side loads, such as torque, may be induced in the bolt shaft. Side loading is typically undesirable. Bolted assemblies can become unintentionally loose by being subject to internal and external forces. For example, over time, workpieces may become very slightly indented or deformed due to the constant force applied to it through the nut. Or, fluctuation of external temperatures may create expansion and retraction of the material creating a loosening effect in the bolted workpiece assembly. Also, loosening may occur through vibration.

To lessen these loosening effects, washers are employed in the assembly. Washers are placed on the bolt prior to nut placement. Typical washers are thin circular disks with an unthreaded hole, usually in the middle. Washers limit indentation of a workpiece material by spreading the force applied to the workpiece over a greater surface area, thereby lowering the pressure applied on the workpiece surface. Additionally, washers known as Belleville washers help prevent bolted workpiece assemblies from loosening due to thermal expansion or vibration. Belleville washers are conical-shaped washers which act as springs. A nut is tightened onto the Belleville washer, flattening the washer. If the nut loosens slightly, the desired pre-load, or a substantial measure thereof, is still applied to the bolted assembly, through the biasing force applied by the Belleville washer.

Although Belleville washers provide a constant pre-load on bolted assemblies, they do not solve other problems inherent in high load applications. For example, bolted workpiece assemblies that employ Belleville washers are sill subject to side loading. As indicated above, side loading is any non-axial force applied to the bolt such as torque. By definition, torque is a rotational force. Since torque is required to tighten the nut against the Belleville washer, the torque applied to the outer diameter of the nut is transferred to the nut's helical thread on the inside of the nut as the nut turns around the bolt's thread. The torque is further transferred to the bolt as the nut's threads turn against the bolt's threads.

Side loading creates a possibility of bolt shearing during tightening, which occurs when the bolt's maximum tensile strength is exceeded. Additionally, residual side loading is often retained in the bolt, and if high enough, can weaken the bolt or reduce the ability of the bolt to absorb stresses that may incident on it and the associated work piece assembly.

Other types of devices besides Belleville washers that supply a constant pre-load or help maintain an initial level of preload also have inherent disadvantages. One type of device is a lock-nut, also referred to a jam nut. Although lock-nuts provide a locking mechanism on the bolt preventing movement or loosening of the lock nut or associated tightening nut on the bolt thereby helping to preserve the initially induced pre-load, these devices do nothing to prevent side loading of the bolt during tightening. Further, since none of the pre-load is stored in the lock nut unlike Belleville washers, the bolt will rapidly unload with any loosening of the nuts relative to the bolt.

Known prior art devices, such as products offered by Hytorc, a division of Unex Corporation, of Mahwah, N.J., that provide for a constant pre-load without inducing side loading utilize multiple parts. Accordingly, they are very expensive compared to jam nuts and/or Belleview washers. Further, because they operate through a portion of the device shearing relative to another portion once a certain desired level of loading is achieved, they cannot be re-used.

Similarly, current devices that replace reaction arms are inadequate for many applications. The same products produced by Hytorc that provide for a constant pre-load may also eliminate the need for a reaction arm. However, the Hytorc products are comprised of a threaded bore and therefore always supply a constant pre-load. Therefore, the products are inadequate in situations where a pre-load is undesirable.

DETAILED DESCRIPTION

Figure 1:
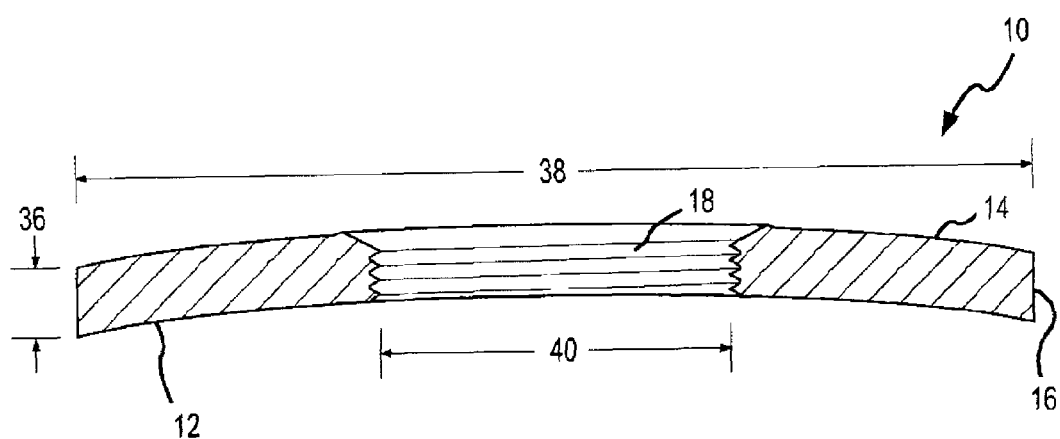
FIG. 1 is a cross sectional view of one biasing fastener (first embodiment) for inducing stored pre-load and isolating side loading of an associated bolt utilized in a workpiece assembly according to one embodiment of the present invention.

A first embodiment of the current invention comprises a biasing fastener including a top surface, a bottom surface, one or more side surfaces, and a threaded bore adapted to mate with a threaded bolt placed through a workpiece assembly. The biasing fastener creates a live load (also referred to as a pre-load) on the workpiece assembly by elongating the portion of the bolt in the workpiece through axial loading when the biasing fastener is threaded onto the bolt firmly engaging with the workpiece, and a nut is tightened against the top surface of the biasing fastener. Live loads can be created on bolted workpiece assemblies in items such as, but not limited to, feed water pumps and pipes, chemical reactors, valves, and mining applications.

The first embodiment biasing fastener is typically comprised of hardened steel with an ISO strength rating of at least 8.8. Alternatively, the biasing fastener may be comprised of other metals including, but not limited lower or higher grade steel alloys. The biasing fastener is also typically comprised of a single unitary piece often in a hexagonal shape. In variations, the biasing fastener is generally circular in shape or of another geometric configuration, adapted to interface with a tightening tool. A threaded and circular bore hole is typically located in the center of the fastener, thereby defining an internal diameter and outer diameter of the biasing fastener. The inner diameter is the diameter of the threaded bore hole. The outer diameter is the length of a straight line passing through the center of the biasing fastener and ending at opposite edges thereof. On a hexagonal fastener, this outer diameter is the distance between two opposite hexagonal points where a straight line connecting the hexagonal points passes through the center of the fastener.

The top surface of the first embodiment biasing fastener is generally concave. In other variations, the top surface slopes from the intersection of the top surface and the one or more side surfaces to the bore hole in a consistent grade. The points of the hexagon on the top surface may include slightly pointed protrusions. In other variations, the points of the hexagon on the top surface are generally flat. The bottom surface of the biasing fastener is coupled to the top surface by way of the one or more side surfaces. Often, the one or more side surfaces are six flat side surfaces connecting top and bottom hexagonally shaped surfaces of substantially similar sizes. Typically, the side surfaces are flat to ensure a tightening tool such as, but not limited to, a wrench or a self-reacting power torque tool, may grip the one or more side surfaces. The thickness of the one or more side surfaces is typically small when compared to the outer diameter of the biasing fastener, with the ratio of the thickness of the one or more side surfaces to the outer diameter being about 0.13 in preferred variations. In other variations, the ratio can vary significantly depending on the amount of live load to be stored in the biasing fastener with a ratio within the range of 0.050 to 0.020 being preferred, within the range of 0.075-0.175 more preferred, and within 0.100-0.150 being most preferred.

The bottom surface of the first embodiment biasing fastener slopes, in a generally convex manner, from an intersection of the one or more side surfaces to an area of the bottom surface adapted to contact the workpiece. This contact area can include a slightly raised surface generally encircling or circumscribing the threaded bore hole. In variations, this surface can comprise a series of small raised surfaces. The contact area when the biasing fastener is in an unloaded condition is typically a small percentage of the entire bottom surface area. For example, the contact area is preferably 20% or less of the entire bottom surface area, more preferably 15% or less of the entire bottom surface area, and most preferably 10% or less of the entire bottom surface area. In some variations, the contact area is knurled.

A second embodiment biasing fastener is operationally similar to the first embodiment. The second embodiment biasing fastener includes a top surface, a bottom surface, one or more side surfaces, and a threaded bore adapted to mate with a threaded bolt placed through a workpiece assembly. Like the first embodiment, the second embodiment is adapted to create a live load on the workpiece assembly by elongating the bolt when the biasing fastener is securely threaded onto the bolt engaging the workpiece, and a nut is tightened against the top surface of the biasing fastener.

The points of the hexagon on the top surface of the second embodiment are generally flat. Additionally, the area of contact between the bottom surface of the biasing fastener and workpiece surface in the fastener's unloaded state is located proximately to the bottom surface's intersection with the fastener's one or more side surfaces. Typically, this contact area encircles or circumscribes the bottom surface. In variations, the contact area can be knurled. The rest of the bottom surface of the second embodiment slopes towards the threaded bore in a convex manner and is generally not adapted to make significant contact with the workpiece.

A third embodiment biasing fastener of the present invention is generally similar in appearance to the first embodiment and is typically adapted to induce a live load in an associated bolt; however, unlike the first and second embodiments, it is not adapted to minimize or eliminate side loading in the bolt shaft. The third embodiment biasing fastener includes a top surface, a bottom surface, one ore more side surfaces, and a bored hole. The bored hole is typically located in the center of the biasing fastener and is not threaded. The top surface of the third embodiment is generally convex and the bottom surface is generally concave, or, the third embodiment is essentially the opposite of the first embodiment. The third embodiment may have a top surface which is at least partially knurled. A first version of the third embodiment has pointed protrusions. A second version of the third embodiment is not comprised of pointed protrusions.

Like the first three embodiments of a biasing fastener, a fourth embodiment of the present invention is hexagonally shaped. However, the top and bottom surfaces of the fourth embodiment are neither convex nor concave, but are substantially flat, like a washer. In variations, the biasing fastener and the fourth embodiment can be circular or any other shape that is adapted to receive a tightening tool or wrench thereon. The third and fourth embodiments are adapted to provide a reaction to a self-reacting tightening tool. For example, the bottom surface of the third embodiment may include a plurality of pointed protrusions that extend downwardly from the bottom surface at locations proximate the intersections of the one or more side surfaces. When the biasing fastener is hexagonally-shaped, the pointed protrusions would be located at the hexagon points. In the fourth embodiment, the reaction would not be created by the pointed protrusions, but would be provided by friction between the washer surface and the workpiece.

One method of using a first embodiment biasing fastener to create a substantially torsionless live load on a bolt shaft in a bolted workpiece assembly comprises: (i) threading the biasing fastener on the bolt; (ii) compressing the biasing fastener, and (iii) elongating the bolt. Initially, a bolt is placed through a bore hole of the workpiece assembly. An example of a workpiece assembly is two sections of flanged pipe. The bolt is placed through one of the many corresponding bore holes contained in the flanges on the two sections of pipe. Typically, the bolt is comprised of a threaded bolt shaft and a bolt head, the diameter of the bolt head being larger than the diameter of the threaded bolt shaft. The shape of the bolt head is typically hexagonal, although in variations, the bolt head may comprise a socket head or another suitable configuration. In bolt variations not containing bolt heads, the bolt is only comprised of a threaded bolt shaft.

Upon placing a bolt through the bore hole of the workpiece assembly, the first embodiment biasing fastener is threaded onto the bolt shaft, ensuring a bottom surface contact area of the biasing fastener firmly engages with the workpiece. At times, a lubricating substance will be placed on the threaded bolt, the biasing fastener threads, or both. The biasing fastener is typically hexagonally shaped, although in variations, the biasing fastener may be circular or of another geometric design. Additionally as described above, the biasing fastener is comprised of a top surface, a bottom surface, one or more side surfaces, and a threaded bore typically located in the center of the biasing fastener. Also as described above, the biasing fastener's bottom surface is generally convex and the contact area of the biasing fastener's bottom surface is generally a raised knurled surface encircling and located proximate the threaded bore hole.

Upon firm tightening or snugging of the first embodiment biasing fastener against the workpiece, a nut is threaded onto the bolt, contacting the biasing fastener's top surface. The top surface of the biasing fastener is generally concave, ensuring the nut contacts the biasing fastener at a portion of the top surface proximately where the top surface intersects with the one or more side surfaces. After contact with biasing fastener at the intersection of the top surface and the one or more side surfaces, the nut continues to be threaded and tightened onto the bolt. During this process, the biasing fastener must be substantially immobilized to ensure that the biasing fastener does not rotate relative to the bolt shaft as the nut rotates. For example, the biasing fastener can be immobilized by placing a wrench on the biasing fastener and securing the other end of the wrench against an immovable object. Another way to secure the biasing fastener is to place a socket attached to the base of a self-reacting tightening tool around the biasing fastener.

As the nut continues to turn, the nut begins to force on the outer edge of the first embodiment biasing fastener towards the workpiece. By immobilizing the biasing fastener with respect to the bolt, as the outer edge of the biasing fastener is pushed towards the workpiece, the contact area of the bottom surface of the workpiece pivots the threaded bore is towards the nut. This pivoting effect creates a substantially less concave top surface and a substantially less convex bottom surface. Since the biasing fastener at this point is rotationally immobilized, the bolt is elastically elongated through pure axial force, creating a highly tensile live load on the bolt without inducing any substantial side loading onto the bolt.

One method of using a second embodiment biasing fastener to create a substantially torsionless live load on a bolt of a bolted workpiece assembly comprises: (i) threading the biasing fastener on the bolt; (ii) threading a nut on the bolt, and (iii) elongating the bolt by pulling the threaded bore of the biasing fastener towards the nut. This method is substantially similar to the first method. However, to elongate the bolt, a diaphragm-like effect is created in the biasing fastener. The diaphragm-like effect is created by using a biasing fastener with a concave top surface, a substantially convex bottom surface, and one or more side surfaces. The bottom surface also includes an area, proximate to the intersection of the bottom surface and the one or more side surfaces that is adapted to contact the workpiece. In other words, the one ore more side surfaces are connected to the bottom surface contact area.

After the bolt is placed into a bored hole in the workpiece assembly and the biasing fastener's contact area is in firm engagement with the workpiece, a nut is threaded onto the bolt. Like with the method relating to the first embodiment, the second embodiment biasing fastener must be rotationally immobilized. At this point, the nut continues to be threaded on the bolt, elongating the bolt through axial force. The axial force pulls the diaphragm portion of the second embodiment biasing fastener upwardly. The rotational force applied to the nut must be great enough to reduce the concavity of the top surface of the biasing fastener. As the concavity is reduced, the biasing fastener's threaded bore, and thereby the bolt, is drawn towards the nut. No side loading occurs on the elongated bolt section.

A method of using a third or fourth embodiment to create a reaction for a self-reacting tightening tool includes (i) placing the embodiment on a bolt; (ii) threading a nut onto the bolt; (iii) engaging a self-reacting tightening tool with the nut and bolt; and (iv) tightening the nut on the embodiment with the tightening tool. In one method, the bolt is a threaded bolt that is placed through a bore located in a workpiece assembly. The bore may or may not be threaded. Upon placing the bolt through the bore, at least one embodiment is then placed onto a bolt end. A nut adapted to mate with the bolt is then threaded onto the bolt until the nut firmly presses the embodiment against the bolted assembly. A self-reacting tightening tool adapted to mate with the nut and the embodiment is then placed over the embodiment and nut. The tool then begins to tighten the nut against the embodiment.

The tool is adapted such that an outer sleeve of the tool is coupled to a substantially stable handle and an inner sleeve of the tool is coupled to a rotatable drive mechanism. As the rotatable drive mechanism tightens the nut onto the bolt and against a third embodiment fastener, the pointed protrusions of the first version of a third embodiment, or the bottom surface hexagon tips in a non-pointed protrusion second version of a third embodiment, create a substantial frictional force between the fastener and the workpiece to ensure that the fastener does not rotate and remains substantially stable relative to the nut. The pointed protrusions create a mechanical hindrance to rotation. Similarly, the bottom surface of the fourth embodiment creates friction between the washer and the workpiece to ensure that washer does not rotate and remains substantially stable relative to the nut when the nut rotates onto the bolt and against the washer. As the outer sleeve is contacting the fastener and washer at this point, the outer sleeve remains substantially stable relative to the nut as well, thereby eliminating the need for a reaction arm.

A bolting system for mechanically joining a workpiece assembly while applying a substantially torsionless live load comprises an elongated bolt, at least one threaded nut, and either a first or second embodiment biasing fastener. The elongated bolt has a threaded shaft extending between a first end and a second end. The bolt typically has a bolt head with a diameter greater than the diameter of the bolt shaft. The biasing fastener includes a generally concave top surface, a generally convex bottom surface including a portion of the bottom surface having a small area in comparison to the entire area of the bottom surface adapted to contact the workpiece, one or more side surfaces, and a threaded bore. The side surfaces should be adapted to receive a tool to prevent rotational movement of the biasing fastener, such as, but not limited to, a wrench or a self-reactive power tightening tool. Typically, the one or more side surfaces are six side surfaces hexagonally arranged.

The system permits the threaded shaft to be placed through an aligned pair of holes in the workpiece assembly. The biasing fastener is adapted to be threaded onto the first end of the threaded shaft until seated firmly against the workpiece assembly. A threaded nut is adapted to be threaded on the bolt's threaded shaft until in contact with the top surface of the biasing fastener. The biasing fastener is also adapted to be immobilized relative to the bolt. The immobilization may occur through a self-reacting tightening tool. In other variations, the immobilization occurs through use of a wrench or another handheld device. Finally, the biasing fastener is adapted to be resiliently deformed through decreasing the concavity of the top surface of the biasing fastener and the convexity of the bottom surface of the biasing fastener as the nut is tightened onto the fastener.

Terminology

The term "workpiece" as used in this specification and the appending claims is meant to convey one or more items containing bored holes which the bolt-washer/fastener-nut assembly will be attached to.

The term "nut" as used in this specification and the appending claims is a perforated block of any suitable material that has an internal screw thread and is used on a bolt or screw for tightening or holding something.

The term "fastener" as used in this specification and the appending claims is meant to convey one of several embodiments as described herein. Where applicable, the fastener devices of several embodiments of the present invention can also be defined as "nuts". Additionally, the embodiments may also be referred to herein as "fasteners", "spring fasteners", "biasing fasteners", or "washers". These terms, where applicable, are interchangeable.

The term "tightening tool" as used in this specification and the appending claims is a device used to exert a twisting force on bolt heads and nuts. A self-reacting tightening tool is a tightening tool which immobilizes the bolt or fastener relative to the tightening tool and uses an external power source to tighten the nut on the bolt.

The term "or" as used in this specification and the appended claims is not meant to be exclusive; rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "coupled" refers to two or more elements that are connected together but not necessarily directly connected together.

As applicable, the terms "about" or "generally" as used herein unless otherwise indicated means a margin of +−20%. Also, as applicable, the term substantially as used herein unless otherwise indicated means a margin of +−10%. It is to be appreciated that not all uses of the above terms are quantifiable such that the referenced ranges can be applied.

The phrase "generally concave" and the term "concave" as used herein refers to both inwardly curving bowl-like sections, as well as, inwardly extending sections in which the surface(s) are more linear or frustoconical in shape. Similary, the phrase "generally convex" and the term "convex" as used herein refers to both outwardly curving rounded sections, as well as, outwardly extending sections that are more linear or frustoconical in shape.

Figure 2:
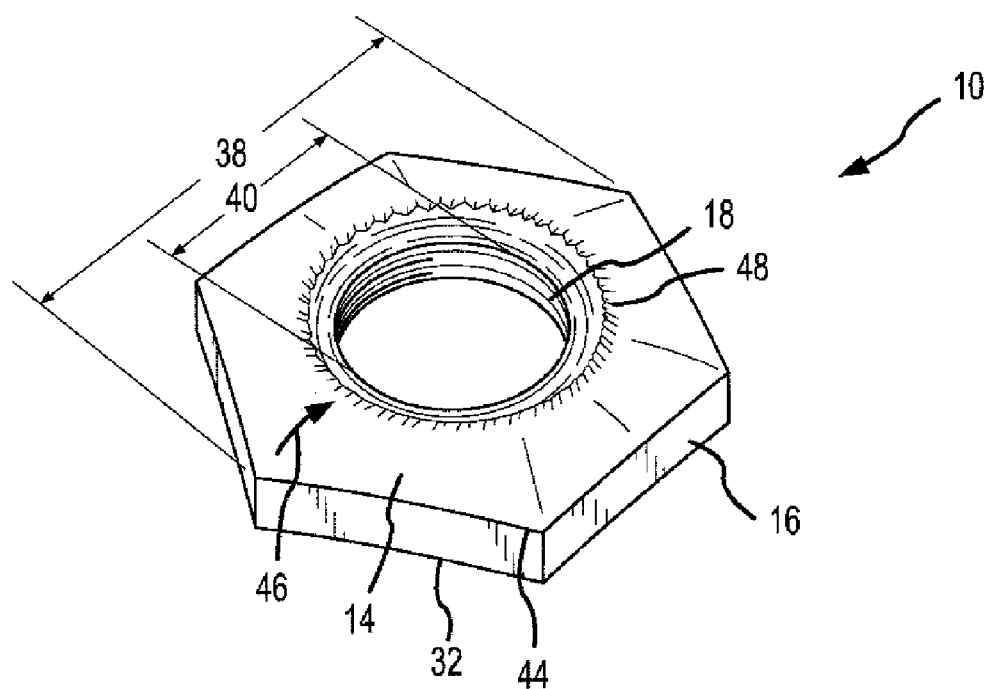
FIG. 2 is an isometric bottom view of the one biasing fastener according to one embodiment of the present invention.
Figure 3:
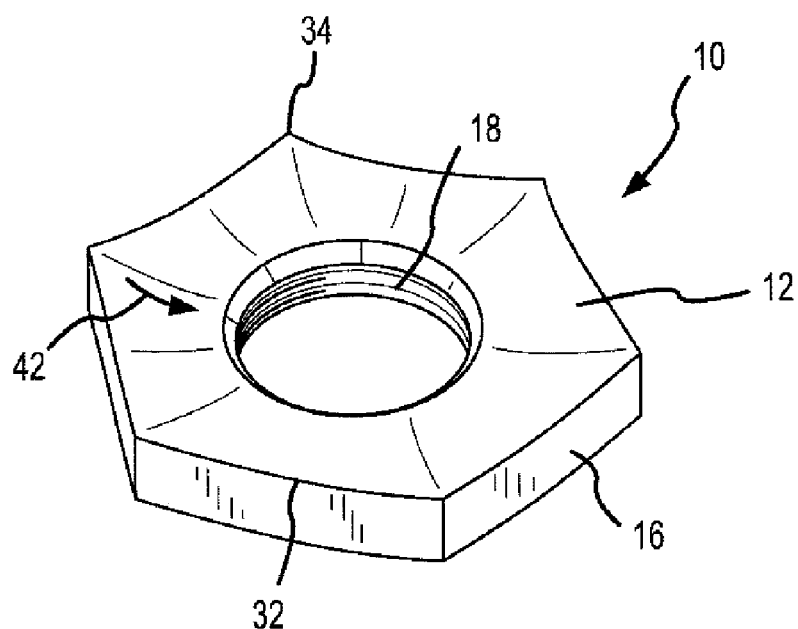
FIG. 3 is an isometric top view of the one biasing fastener according to one embodiment of the present invention.

First Embodiment of a Biasing Fastener Adapted for Creating a Substantially Torsionless Live Load on a Bolted Assembly Referring to FIGS. 1-3, the first embodiment of the biasing fastener 10 for creating a substantially torsionless live load on a bolted assembly is illustrated. The first embodiment biasing fastener is typically unitary being fabricated from a single piece of material, typically high strength steel. The fastener can be forged, machined, cast or produced by other suitable means known to one of ordinary skill in the art. The biasing fastener is comprised of a top surface 12, a bottom surface 14, one or more side surfaces 16, and a threaded bore 18. The threaded bore 18 is typically located in the center of the biasing fastener 10 and is typically a circular bored hole with inner diameter 40. The biasing fastener 10 is sized to allow a nut, upon tightening, to first contact the top surface proximate the intersection 32 of the top surface 12 and the one or more side surfaces 14. Accordingly, the shape of the top surface 12 of the biasing fastener 10 is generally concave 42.

The one or more side surfaces 16 extend between, and interface with generally parallel top and bottom surfaces 12 & 14 and as illustrated are hexagonally arranged. As shown, the intersections between two side surfaces and the top surface may include slightly protruding points 34 that interface with the bottom surface of an associated nut. The side surfaces 16 are typically flat to ensure a tightening tool such as, but no limited to, a wrench or a self-reacting torque device may grip the biasing fastener 10 to rotate the biasing fastener or, more typically, to hold the biasing fastener immobile. The side surfaces may also be arranged in other configurations suitable with interfacing with other tightening tools.

The typical ratio of the thicknesses 36 of a side surface 16 to the outer diameter 38 of the biasing fastener 10 is preferably within the range of 0.050 to 0.020, more preferably within the range of 0.075-0.175, and most preferably within the range of 0.100-0.150. As is evidenced by FIG. 1, the thickness of the side surfaces is generally the same as the distance between the top and bottom surfaces 14 & 12. The ratio relates directly to the amount of load required to flex or flatten the biasing fastener, which relates to the biasing force or live load that the fastener can apply. By adjusting the ratio, the amount of live load that is applied to the associated bolt can be predetermined. In other variations, the side surfaces may comprise a thicker lipped perimeter portion that includes the side surfaces adapted to interface with the tightening tool and a thinner interior section between the top and bottom surfaces designed to flex a controlled amount when a nut is tightened there against.

The bottom surface 14 slopes from the intersection 44 of the bottom surface 14 and the one or more side surfaces 16 to a contact area 48 in a generally convex manner 46. The contact area circumscribes the threaded bore 18 proximate to the bore hole. The contact area 48 can but need not comprise a knurled surface that is slightly raised above the immediately surrounding region of the bottom surface 14. The surface area of the contact area 48 is low as compared to the total surface area of the bottom surface 14. Preferably, the area of the contact area 48 is less than 20% of the total area of the bottom surface, more preferably less than 15% and most preferably less than 10%. The contact area acts as a cantilever pivot wherein the portion of the fastener inside of the contact area including any associated shaft of a bolt are lifted upwardly as the outer edge 32 of the fastener at the top surface 12 is pressed downwardly by a nut being tightened thereagainst.

Second Embodiment of a Biasing Fastener Adapted for Creating a Substantially Torsionless Live Load on a Bolted Assembly Referring to FIGS. 10-12B, a second embodiment of a biasing fastener 11 for creating a substantially torsionless live load on a bolted assembly is illustrated. Like the first embodiment, the second embodiment fastener is unitary. The biasing fastener 11 is comprised of a top surface 15, a bottom surface 17, one or more side surfaces 19, and a threaded bore 21. The threaded bore 21 is typically located in the center of the biasing fastener 11 and is typically a circular bored hole with inner diameter 23. The biasing fastener 11 is sized to allow a nut 25, upon tightening, to first contact the intersection 27 of the top surface 15 and the one or more side surfaces 19. Accordingly, the shape of the top surface 15 of the biasing fastener 11 is generally concave.

As illustrated, the one ore more side surfaces 19 comprise six side surfaces 19 hexagonally arranged. The tips of the hexagon 29 are substantially flat and co-planer. In other variations, the tips of the hexagon can comprise slightly pointed protrusions. The one or more side surfaces 19 intersect with and are connected to the top and bottom surfaces 15 & 17. The side surfaces 19 are typically flat to ensure a tightening tool such as, but no limited to, a wrench or a self-reacting tightening tool may grip the biasing fastener 11 to rotate the biasing fastener 11 or keep the biasing fastener 11 immobile. The biasing fastener 11 may also comprise other geometric shapes that can interface with a corresponding tightening tool.

Figure 10:
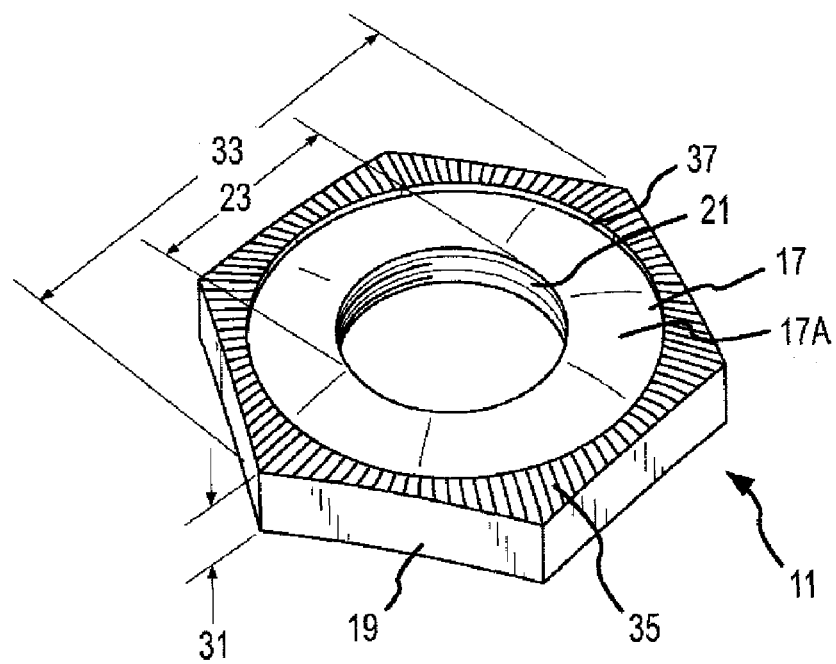
FIG. 10 is an isometric bottom view of yet another biasing fastener (second embodiment) for inducing stored pre-load and isolating side loading of an associated bolt utilized in a workpiece assembly according to one embodiment of the present invention.
Figure 11:
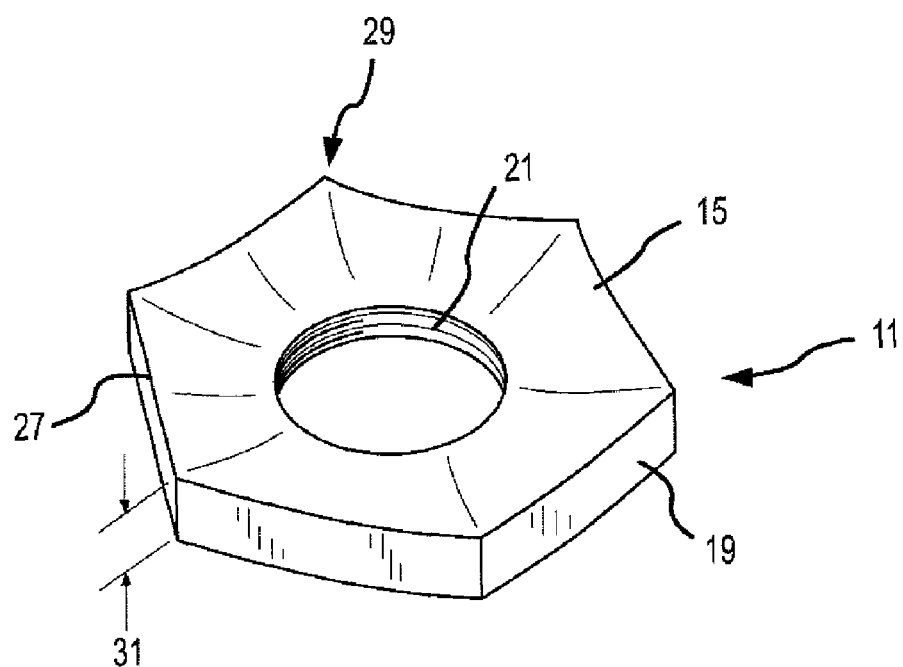
FIG. 11 is an isometric top view of the biasing fastener of FIG. 10 according to one embodiment of the present invention.
Figure 12A:
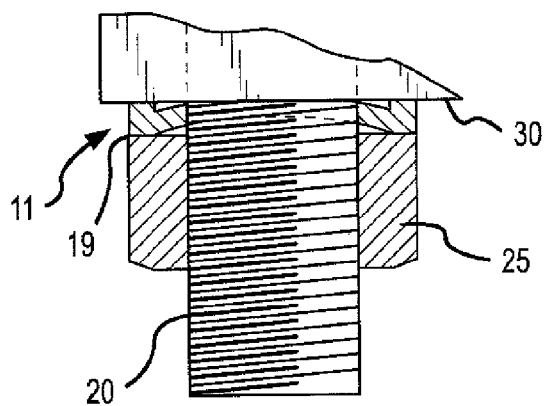
FIG. 12A is a cross sectional view of the biasing fastener of FIG. 10 illustrating the manner in which the device is placed between the nut and the workpiece according to one embodiment of the present invention.
Figure 12B:
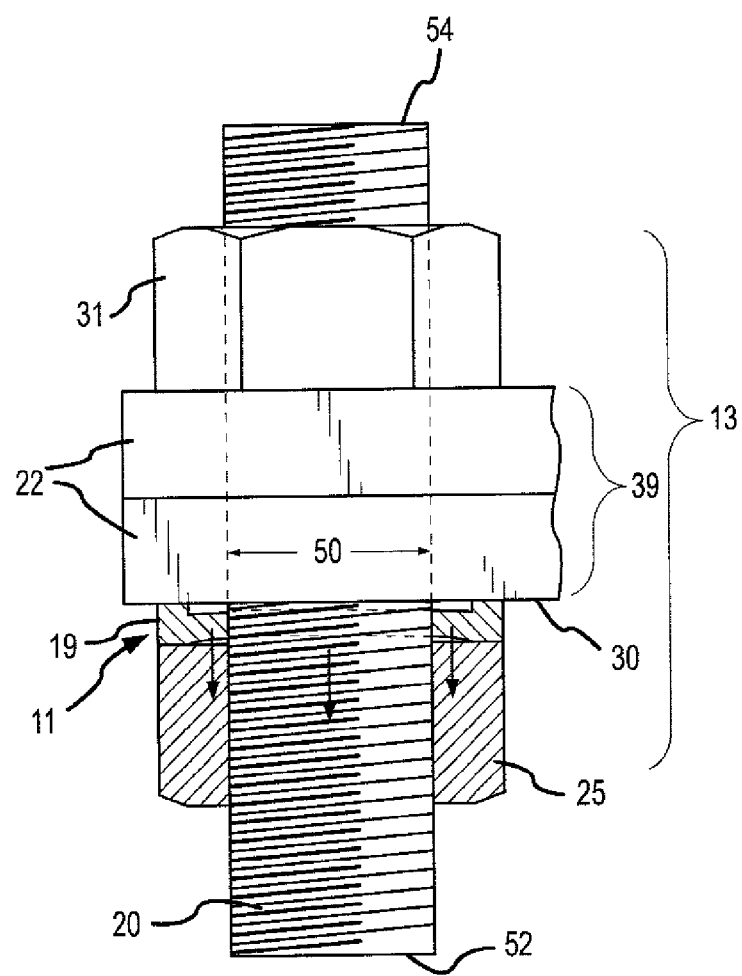
FIG. 12B is a cross sectional view of a biasing fastener of FIG. 10 illustrating the manner in which the biasing fastener pulls the bolt towards the nut as the nut is tightened according to one embodiment of the present invention.

The bottom surface 17 as shown in FIG. 10 comprises two primary sections: a knurled planar perimeter section 35; and a generally convex section 17A extending inwardly of the perimeter section and bounding the bore hole 21. The perimeter section, which can be smooth in other variations, forms a foot that is adapted to rest against the surface of an associated workpiece as best shown in FIGS. 12A and 12B. The convex portion 17A is separated from the knurled section 35 by an inwardly extending ridge 37 and is generally parallel to the concave top surface 15 defining a thickness therebetween. The parallel portion between the top and bottom surfaces can be referred to as diaphragm. It is the diaphragm that is flexed outwardly as shown in FIG. 12B when an associated nut is tightened thereby applying the desired pre-load. By adjusting the thickness of the diaphragm relative to the diameter of the fastener, the biasing force, and accordingly, the live load applied to an associated bolt can be controlled. The desired ratios of the thickness of the diaphragm and the diameter of the second embodiment fastener are similar to those provided for the sides and diameter of the first embodiment.

Third Embodiment of a Biasing Fastener for Creating a Live Load on a Bolted Assembly and a Reaction Point for a Self-Reacting Tightening Tool.

Referring to FIGS. 7-9, 14, and 15, two versions of an embodiment of a biasing fastener 100 for creating a live load on a bolted assembly or a reaction point for a self-reacting tightening tool are illustrated. Like the first and second embodiments, the third embodiment fastener is unitary. Unlike the first and second embodiments, this embodiment does not create a substantially torsionless live load primarily because the bore 108 is unthreaded. Rather, a key feature of this embodiment is that it provides a reaction point for a self-reacting tightening tool, either by digging into the surface of the workpiece or by the friction created between a portion of the embodiment's bottom surface 104 and a first surface 30 of the workpiece.

The biasing fastener 100 is comprised of a top surface 102, the bottom surface 104, one or more side surfaces 106, and the unthreaded bore 108. The unthreaded bore 108 is typically located in the center of the biasing fastener 100 and is typically a circular hole with inner diameter 110. In a first version of the third embodiment, the biasing fastener 100 is sized to allow a nut 25, upon tightening, to first contact the portion of the top surface 102 near the bore hole 112. Hence, although having a similar appearance as the first embodiment, in use the first version is essentially upside down when compared to the first embodiment. Specifically, the shape of the top surface 102 of the first version is generally convex, creating the biasing effect.

The one or more side surfaces 106 run between, and are connected to, generally parallel top and bottom surfaces 102 & 104. The side surfaces 106 are typically flat to ensure a tightening tool such as, but not limited to, a wrench or a self-reacting tightening tool may grip the biasing fastener 100 in order to keep the biasing fastener 100 immobile relative to the associated nut. One first and second version of a third embodiment is a fastener having 6 sides of substantially equal size.

In both versions, the ratio of the thickness 116 of the side surface 106 to the outer diameter 118 of the biasing fastener 100, like the first embodiment, controls the amount of live load applied to an associated bolt and comprises similar preferred ranges as the first embodiment.

In one third embodiment, the bottom surface 14 slopes from the intersection 120 of the bottom surface 104 and the one or more side surfaces 106 upwardly to the bored hole 108 in a convex manner. As best shown in the illustrated FIG. 7, the side surfaces are in the form of a hexagon wherein the sides' intersection with the bottom surface pointed protrusions 122 extend downwardly away from and generally perpendicular to the perimeter edge of the bottom surface. The protrusions are configured to bite or dig into the surface of the workpiece, thereby creating a mechanical hindrance to prevent the fastener from rotating when utilized as the reaction site with a self-reacting tightening tool. It is appreciated that with the third embodiment a back up wrench will often be required to prevent the head of the bolt from rotating while the nut is being tightened. One second version of the third embodiment is not comprised of pointed protrusions, but may still preclude the need for a reaction arm on a self-reacting tightening tool by a portion of the bottom surface of the embodiment, typically the tips of the hexagon on the bottom surface, creating friction with a surface of the workpiece.

Fourth Embodiment for Creating a Reaction Point for a Self-Reacting Tightening Tool.

Figure 13:
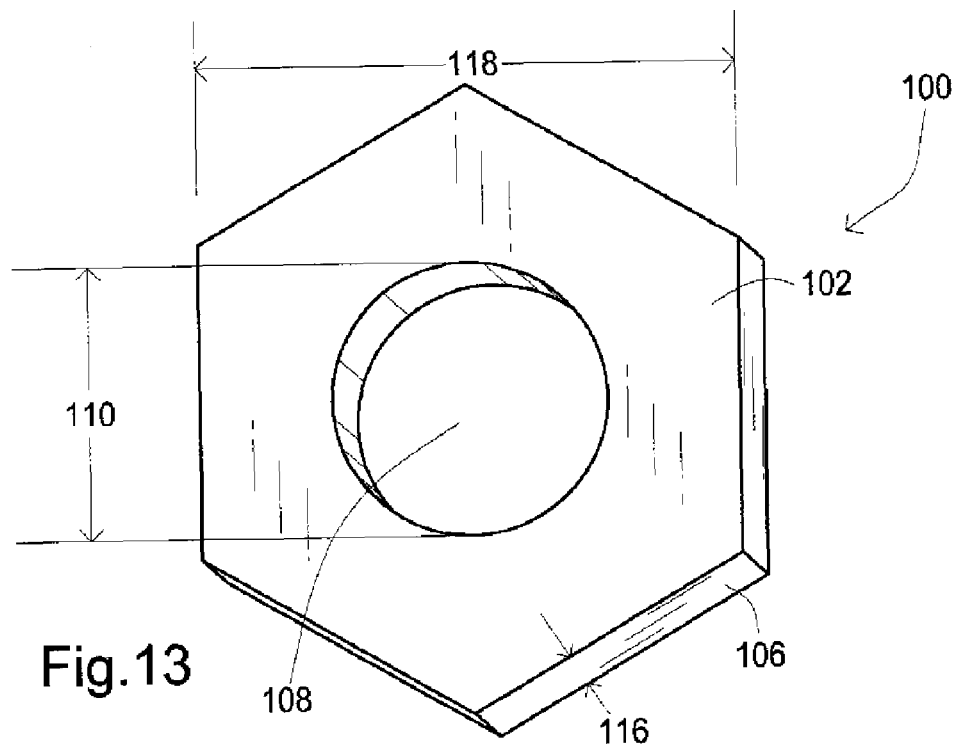
FIG. 13 is an isometric view of a biasing fastener (fourth embodiment) for providing a reaction point for a self-reacting tightening tool according to one embodiment of the present invention.
Figure 14:
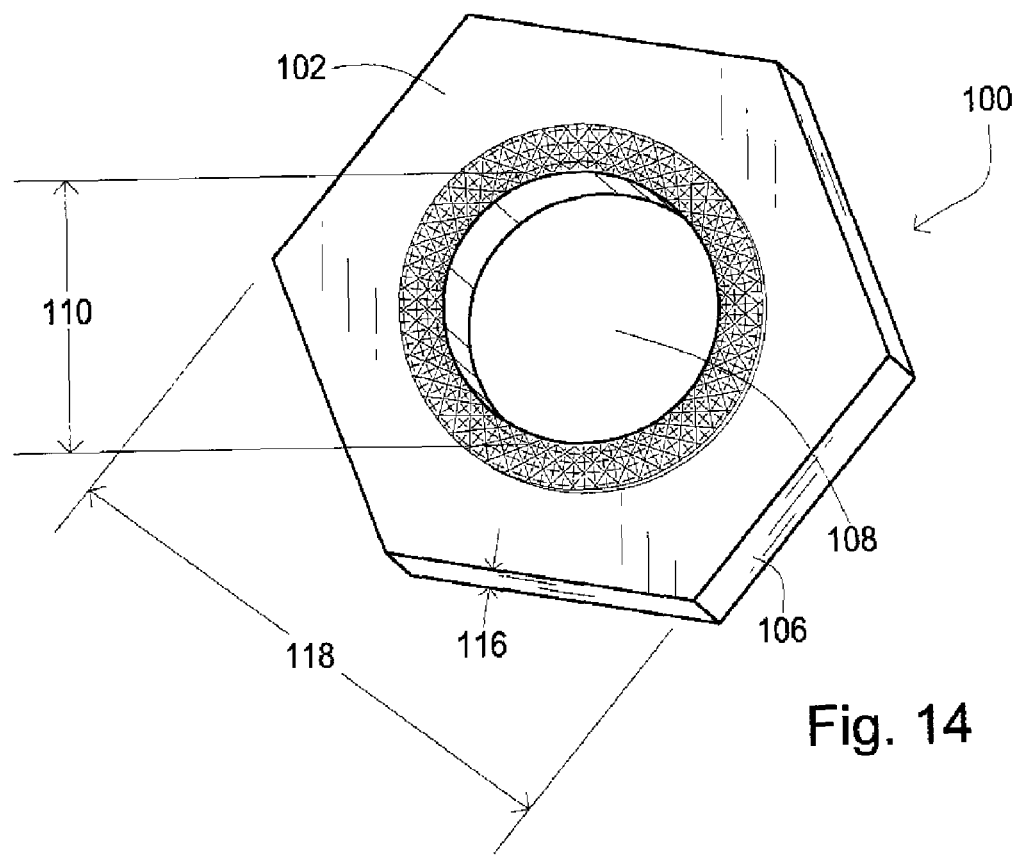
FIG. 14 is an isometric view of a knurled first version biasing fastener (third embodiment) for providing a reaction point for a self-reacting tightening tool and creating a live load on the bolt according to one embodiment of the present invention.

As best shown in FIG. 13, in a fourth embodiment fastener, the top surface 102 of a washer 100 is substantially flat. Therefore, upon tightening a nut 25 against the washer, the nut will typically generally contact the top surface in a substantially uniform manner. Like other embodiments, the one or more side surfaces 106 run between, and are connected to, generally parallel top and bottom surfaces 102 & 104. The side surfaces 106 are typically flat to ensure a tightening tool such as, but not limited to, a wrench or a self-reacting tightening tool may grip the washer 100 in order to keep the washer 100 immobile relative to the associated nut. One fourth embodiment washer typically has 6 sides of substantially equal size.

In the fourth embodiment, the ratio of the side surface to the outer diameter is preferably in the range 0.005 to 0.200, more preferably within the range of 0.010-0.150, and most preferably within the range of 0.050-0.100. It is to be appreciated that the actual ratio (for all embodiments) can vary from the preferred ranges as the actual ratio depends on (i) whether an embodiment is intended to induce a live load and (ii) the modulus of the material from which the fastener is constructed.

The washer embodiment, as best shown in FIG. 13, does not include pointed protrusions. In the fourth embodiment, the friction between the bottom surface of the washer 100 and a first surface 30 of the workpiece is sufficient to keep the washer from rotating upon tightening of the nut. Therefore, since the washer is kept substantially stable, a first socket head 58 that is engaged with the fourth embodiment is also kept substantially stable.

One Method of Using the First Embodiment Biasing Fastener to Create a Substantially Torsionless Live Load on a Bolt of a Bolted Workpiece Assembly Referring to FIGS. 4A-6, a method to create a substantially torsionless live load on a bolt 20 of a bolted workpiece 22 assembly 24 is illustrated. The biasing fastener 10 creates a live load on the workpiece assembly 24 by elongating the portion of the bolt located in an associated bore extending through the workpiece 26 by axially loading the portion of the bolt shaft. Further, because the first embodiment fastener is threaded, it essentially acts to isolate the portion of the bolt below the fastener from the torsional loads induced on the other side of the fastener by the nut when it is tightened.

Figure 5:
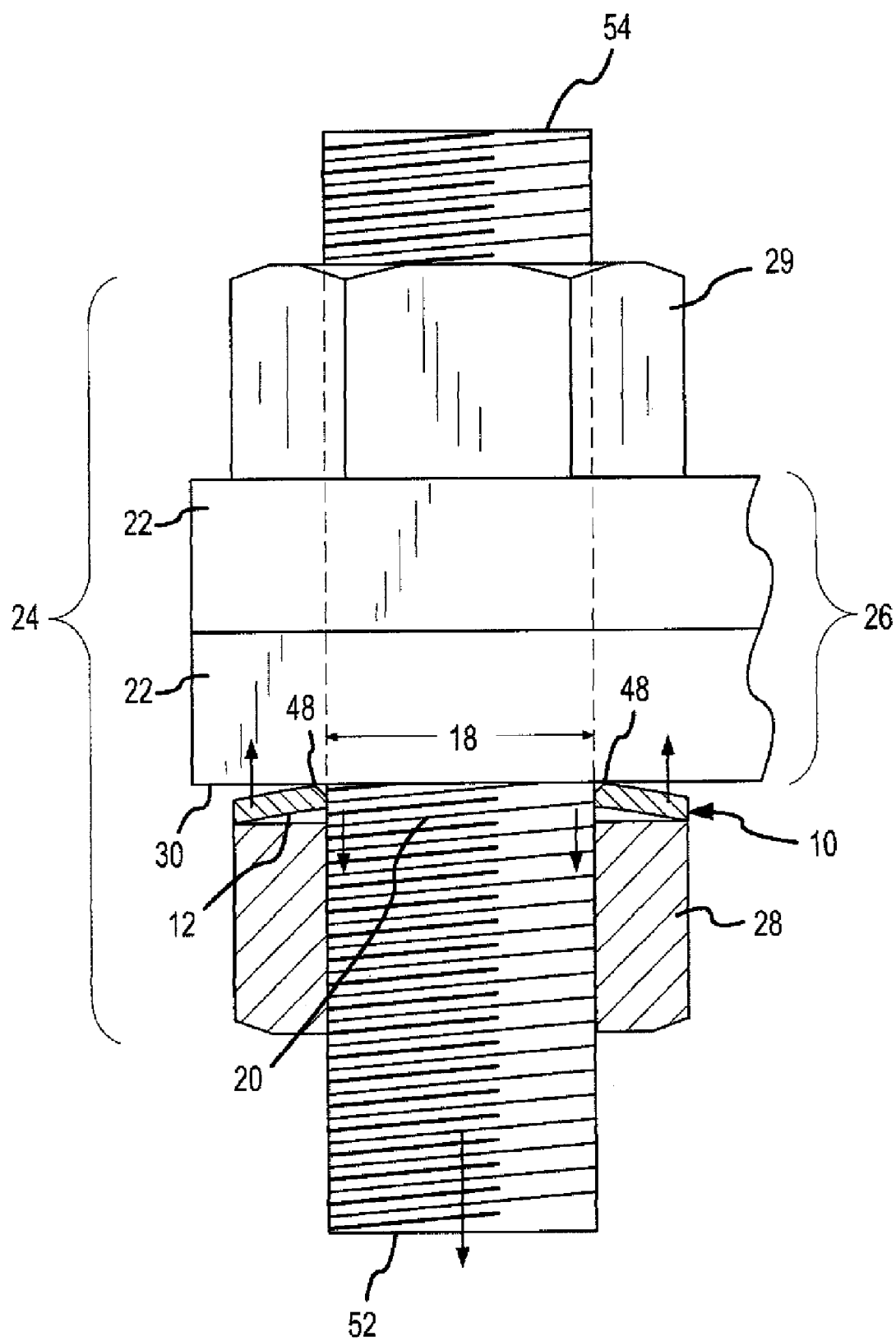
FIG. 5 is a cross sectional view of the one biasing fastener illustrating the directional forces involved when tightening the nut against the one biasing fastener according to one embodiment of the present invention.

Initially, as shown in FIG. 5, a bolt 20 is first threaded through the associated bore in the workpiece assembly. The bolt 20 has a first end 52 and a second end 54 that is axially opposite the first end 52. The second end as shown in FIG. 5 comprises a second nut 29 but often the second end will comprise a bolt head. The decision whether to use a nut 29 instead of a bolt with an integral head is dependent on the particularities of the workpiece and the bolting configuration associated therewith.

Figure 4A:
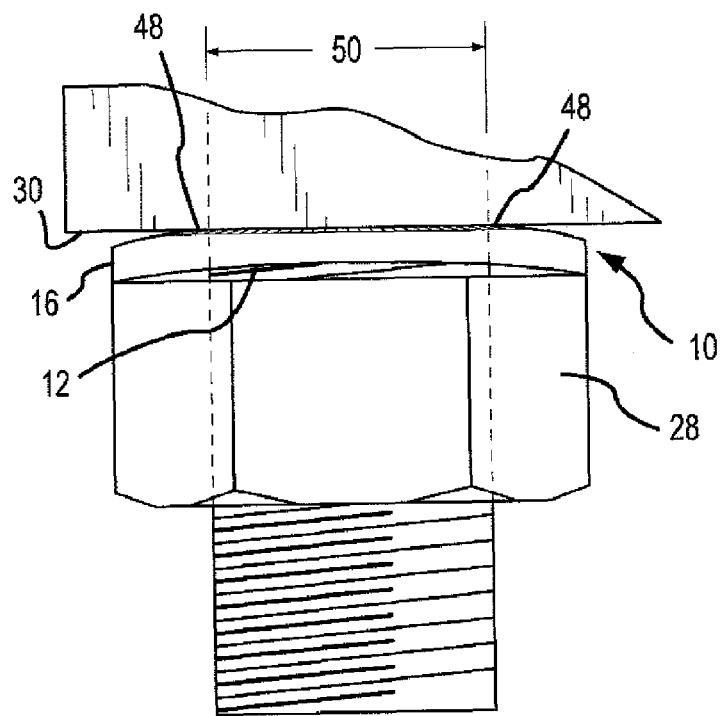
FIG. 4a is a side view of the one biasing fastener illustrating the manner in which the nut contacts the one biasing fastener and pulls the bolt and fastener towards the nut according to one embodiment of the present invention.
Figure 4B:
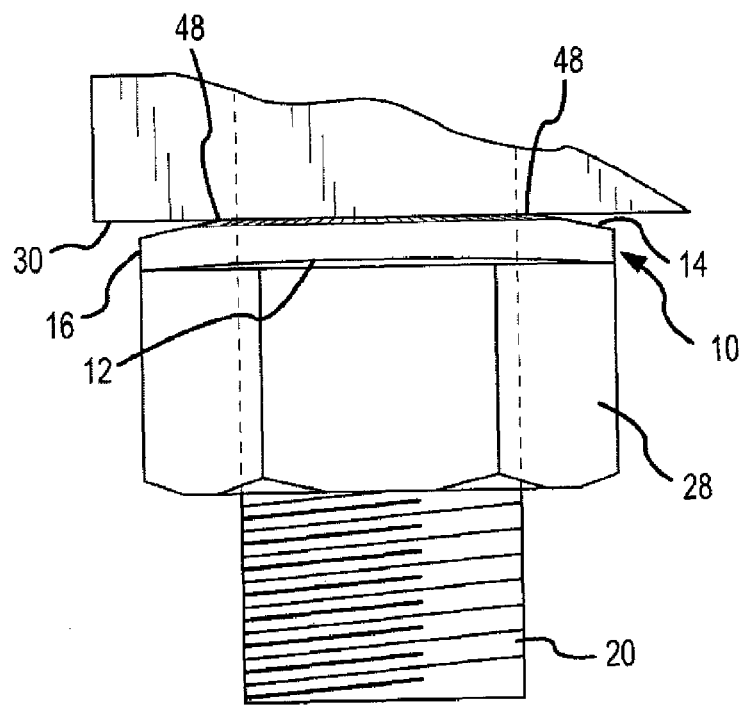
FIG. 4b is a side view of the one biasing fastener illustrating the manner in which the one biasing fastener resiliently deforms according to one embodiment of the present invention.

Next, the biasing fastener 10 is threaded onto the bolt 20 until in firm engagement with the workpiece 22. The fastener is not typically tightened to any appreciable torque level when compared to the bolts final desired pre-load, but it is tightened until all slack and play is eliminated from the work piece joint. When in this configuration, only the contact area 48 will be in direct contact with the workpiece, as best show in FIG. 4A. A nut 28 is then threaded over the first end of the bolt until in contact with the top surface of the first embodiment biasing fastener. As shown in FIG. 4A, the bottom surface of the nut only on the outer rim or perimeter of the biasing fastener's concave top surface.

Figure 6:
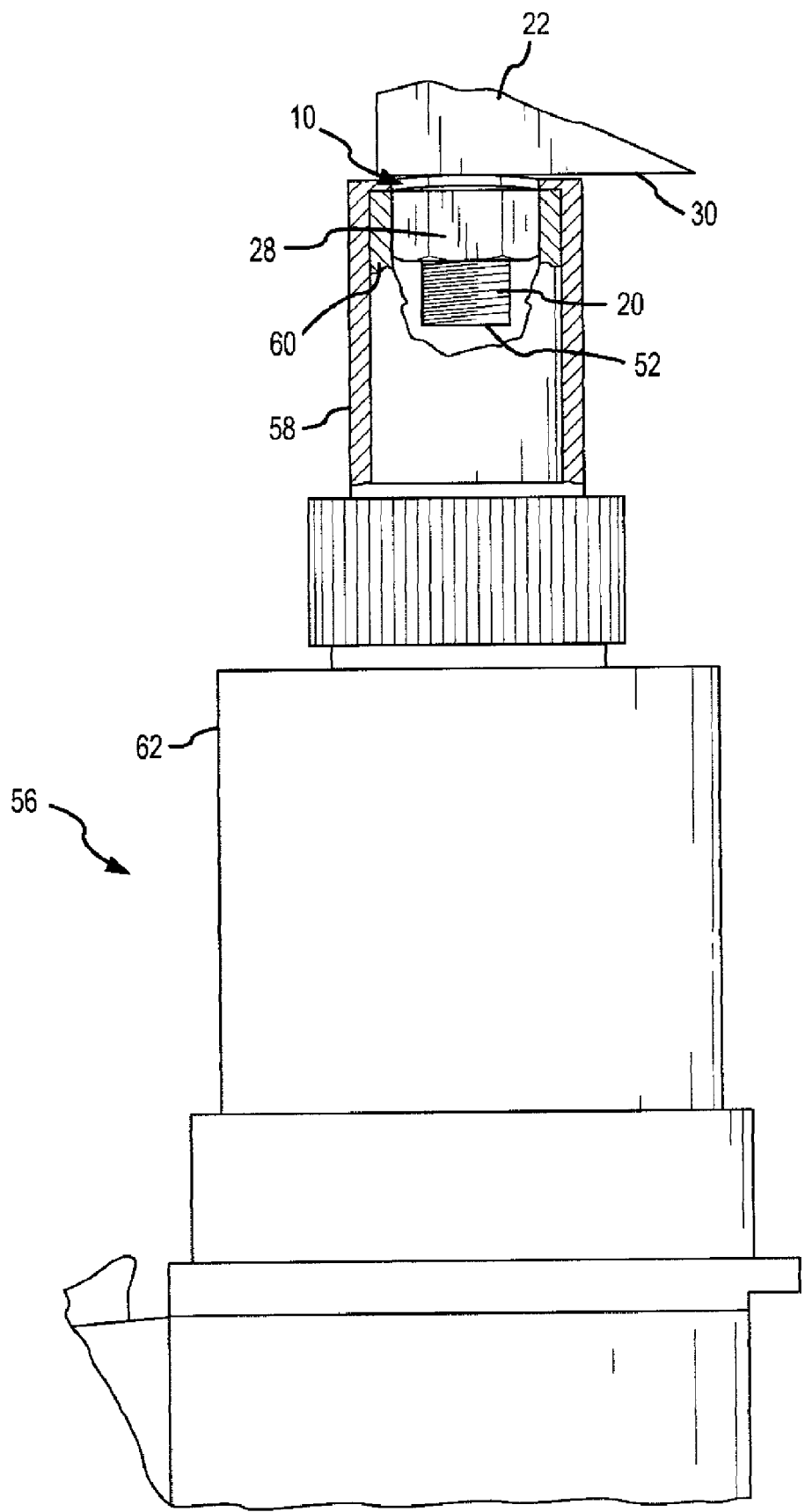
FIG. 6 is a side view of a self-reacting tightening tool for tightening bolted workpiece assemblies with the associated sockets shown in cross section according to one embodiment of the present invention.
Figure 7:
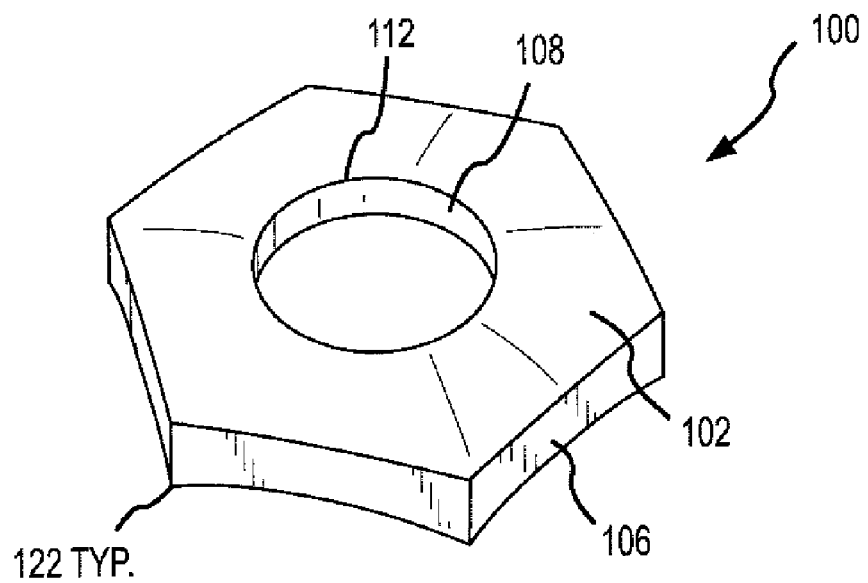
FIG. 7 is the top view of a first version biasing fastener (third embodiment) for inducing stored pre-load in an associated bolt utilized in a workpiece according to another embodiment of the present invention.
Figure 8:
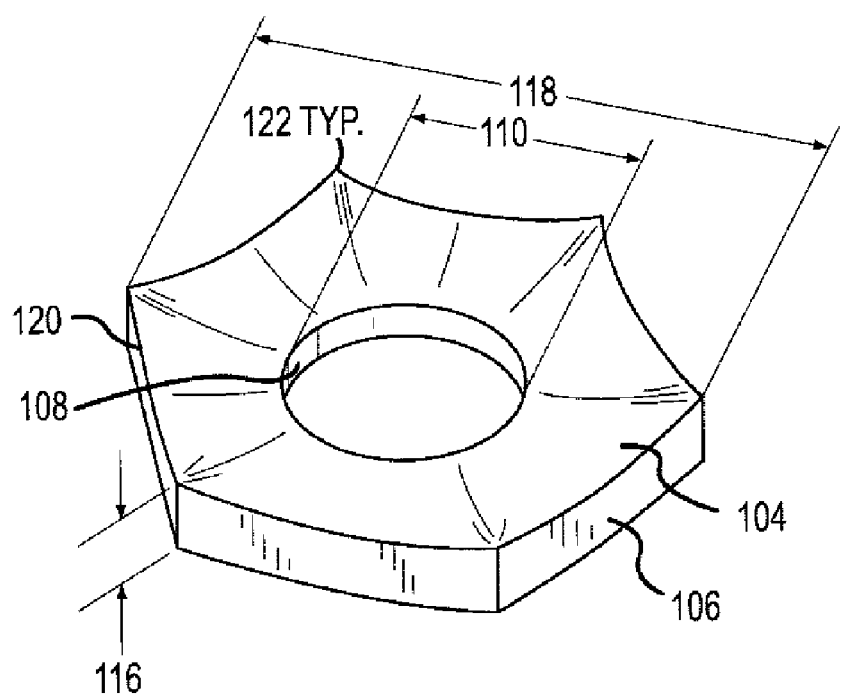
FIG. 8 is the bottom view of the other biasing fastener according to an embodiment of the present invention.

Next, as shown for instance in FIG. 6, the biasing fastener 10 is then immobilized using a device such as, but not limited to, a self-reacting tightening device 56 that includes a first socket head 58 and a second socket head 60. The first socket head 60 engages with the biasing fastener 10 and is fixed relative to the body 62 of the tightening tool 56. The second socket head engages the nut 28 and is adapted to apply torque to the nut to tighten it against the biasing fastener 10. It is appreciated that the biasing fastener through the first socket serves as the reaction site through which torque is applied to the nut relative to the bolt's threaded shaft. Referring to the arrows provided on FIG. 5 indicating the relative direction of acting forces, as the nut is tightened and increasing levels of torque are applied to the nut 28, the nut presses downwardly onto the outer edge of the top surface of the biasing fastener thereby resiliently deforming the top surface 12 and reducing its concavity. Simultaneously, the fastener's bottom surface 14 pivots at the contact area 48 pulling the treaded bore hole 18 and the coupled portion of the bolt 20 therewith.

Concerning this embodiment as well as the second and third embodiments, the amount of resilient deformation is significant and measurable. For instance in a variation of the first embodiment designed for a ¾" bolt the axially depth of the concavity is about 0.065". Most if not substantially all of the concavity is removed during tightening and accordingly, the live load acts over a substantial portion of this axial distance. Put another way, the live load on the bolt or at least a significant fraction thereof will be maintained even if the bolt relative to the nut loosens a significant portion of 0.065". In converse with a jam nut, a relative change in axial position of the bolt relative to the nut of 0.001" or less can completely relieve all live load. The actual axial depth of the concavity or in relation to the second embodiment, the amount of deflection of the concave diaphragm will vary substantially and significantly depending on several factors including (i) the intended use of the fastener, (ii) the desired preload, (iii) the size of the corresponding bolt, and (iv) the material of which the fastener is comprised.

Figure 4C:
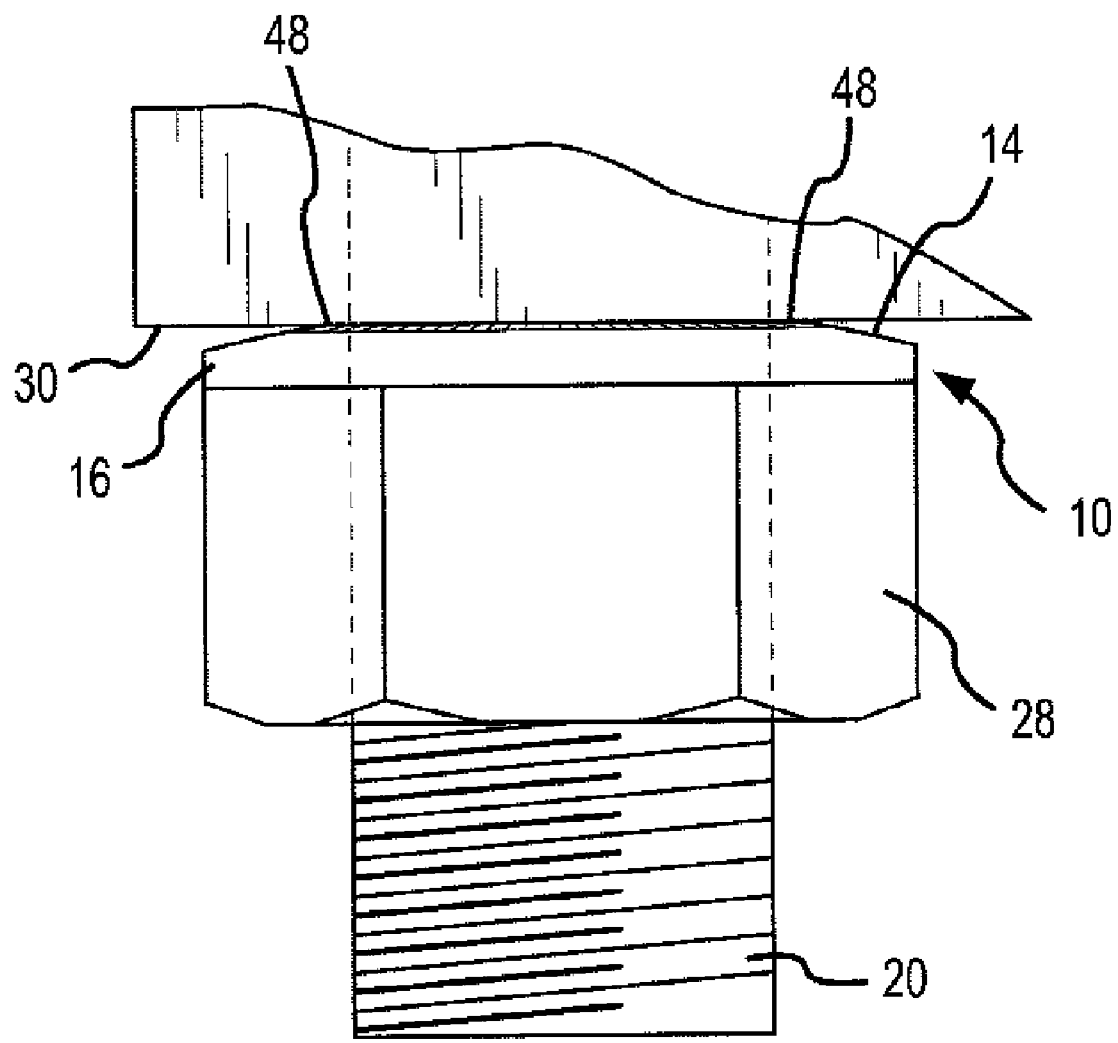
FIG. 4c is a side view of the one biasing fastener illustrating the manner in which the one biasing fastener creates a locking pre-load with the nut according to one embodiment of the present invention.

FIG. 4C illustrates a bolted assembly that has been fully tightened to induce the desired level of live load. It is noted that much of the concavity of the top surface 12 has been removed and the top surface is essentially flat. The convexity of the bottom surface has also been reduced substantially. It is appreciated if the nut loosens slightly, such as due to thermal or vibrational forces incident on the assembly, the biasing fastener will resiliently spring towards it original configuration with a concave top surface and continue to apply at least a measure of pre-load much in the same manner as a Belleville washer.

A Method of Using a Second Embodiment Biasing Fastener to Create a Substantially Torsionless Live Load on a Bolt of a Bolted Workpiece Assembly Referring to FIGS. 12A-12B, a method of creating a substantially torsionless live load on a bolt 20 of a bolted workpiece 22 assembly 13 using a second embodiment biasing fastener is illustrated. Generally, the process of assembling and tightening a bolt assembly using the second embodiment biasing fastener is substantially the same as used for the first biasing fastener. The significant operational difference between the two embodiments concerning their use is how the fastener acts to apply and maintain the induced live load.

Like with the first embodiment, the second embodiment biasing fastener 11 creates a live load on the workpiece assembly 13 by elongating the portion of the bolt 39 located in an associated bore of the workpiece 22 through axial loading when the biasing fastener 11 is threaded onto the bolt 20, firmly engages with the workpiece 22 and a nut 25 is tightened against the top surface 15 of the biasing fastener.

To begin, a bolt 20 is placed through a bore hole 50 in the workpiece 22. The bolt 20 has a first end 52 and a second end 54 that is axially opposite the first end 52. The second end may comprise a bolt head or it may comprise a end of a headless threaded bolt shaft and an associated second nut 31. Next, a biasing fastener 11 is threaded onto the first end 52 of the bolt 20 until firmly seated against a first surface 30 of the workpiece 22. A nut 25 is then threaded onto the first end 52 of the bolt 20 until contacting at least a section of the top surface 15 of the biasing fastener 11.

The biasing fastener 11 is then immobilized using a device such as, but not limited to, a self-reacting tightening device including a first socket head and a second socket head. The first socket head engages the biasing fastener's 11 one or more side surfaces 16 and is fixed relative to the body of the tightening tool. The nut 25 is then tightened against the biasing fastener 11 via the second socket to which torque is applied, resiliently deforming the top surface 15 of the biasing fastener 11 by reducing the top surface 12 concavity and the bottom surface 17 convexity by elastically stretching the bolt which in turn pulls the surrounding portion of the fastener resiliently upwardly. Essentially, the interior portion of the biasing fastener acts as a diaphragm storing a predetermined amount of live load energy in the fastener. The amount of live load energy stored and continuously applied to the bolt depends on the thickness of the fastener between the top and bottom surfaces as discussed above.

With reference to FIGS. 12A & B, the interaction of the various axial and torsional forces during a tightening operation using a self-reacting tightening tool are described. As torque is applied to the nut 25, it is transferred into the threads of the bolt shaft pulling the bolt shaft axially upwardly. Because the biasing fastener is threaded and because the bottom surface of the nut 25 is incident against the top surface of the biasing fastener. The counteracting forces at play essentially lock or immobilize the biasing fastener relative to the nut. Accordingly, the portion of the bolt shaft below the biasing fastener is nut permitted to rotate relative to the biasing fastener and so long as the fastener is unable to rotate, no torsional or side loading will be applied to this portion of the bolt. However, the nut as it is tightened and moves down the pitched threads of the bolt shaft rotating usually clockwise relative to the immobilized bolt and biasing fastener combination, the bolt is stretched. In the case of the third embodiment biasing fastener this stretching resiliently flexes the fastener such as a diaphragm with the biasing or spring force required to flex and deform the fastener being continuously applied to the bolt thereby maintaining the bolts loaded state. A similar process is in works with the second embodiment fastener but instead of acting as a diaphragm, the fastener pivots over a contact area 48 to pull the associated bolt axially and apply a continuous live load.

In order for this process to be effective, three elements of the biasing fastener are typically required: (i) a resiliently (or elastically deforming portion) that can store the energy of the tightening process over a finite distance (i.e. the distance of flexure of the fastener's resilient portion between loaded and loaded states); (ii) a threaded interior bore hole that interfaces with the bolt shaft to effectively immobilize one relative to the other; and (iii) a means for holding the biasing fastener in place relative to the nut thereby allowing its use with self-reacting tightening tools. It is appreciated that the a prior art jam nut does deform elastically a very minuscule amount when a nut is compressed against it but this resilient deformation is extremely small relative to the amount of movement of the described embodiments as to be negligible for purposes of this disclosure. Lacking a threaded interior, the ability to isolate the torsional loads is lost, but the threadless biasing fastener can still be used to induce a live load using a self-reacting tightening tool as indicated relative to the third embodiment biasing fastener herein. Strictly speaking, the means for holding the nut in place using a self-reacting tightening tool or other tightening tool, such as a wrench, is not absolutely essential in all variations. However, the lack of a means to interface with a tightening tool will eliminate the ability of the biasing fastener to be used with a self-reacting tightening tool.

Figure 9A:
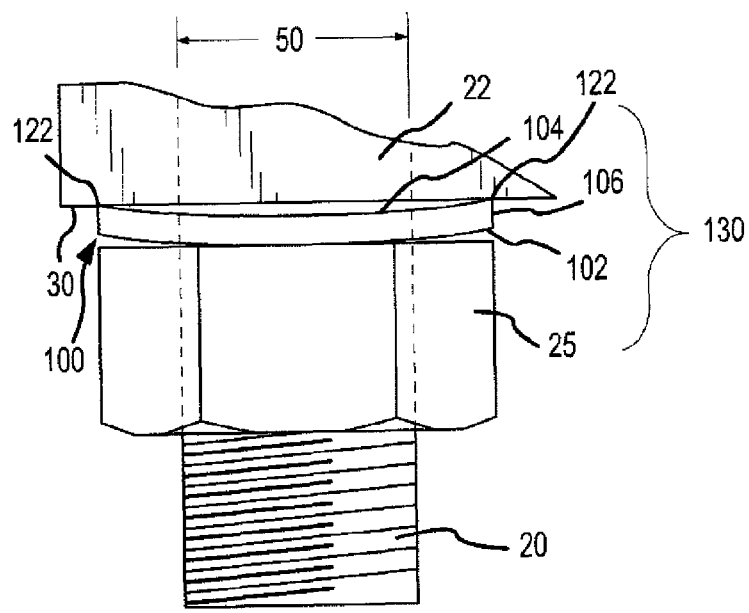
FIG. 9A is a side view of the other biasing fastener illustrating the manner in which the other biasing fastener contacts the workpiece according to one embodiment of the present invention.
Figure 9B:
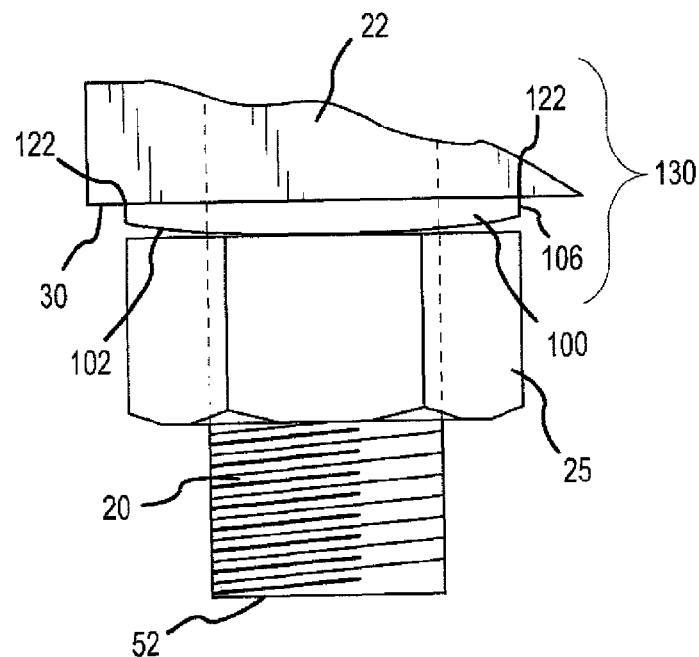
FIG. 9B is a side view of the other biasing fastener illustrating the manner in which the other biasing fastener creates a live load on the bolt according to one embodiment of the present invention.

A Method of Using a Third Embodiment Biasing Fastener to Create a Live Load on a Bolt of a Bolted Workpiece Assembly and to Create a Reaction Point When Using a Self Reacting Tightening Tool Referring to FIGS. 9A-9B, a method to create live load on a bolt 20 of a bolted workpiece 22 assembly 130 and a reaction point when using a self-reacting tightening tool is illustrated. The biasing fastener 100 creates a live load on the workpiece assembly 130 by providing a biasing force to the bolt 20 when the biasing fastener 100 is placed onto the bolt 20, firmly engages with the workpiece 22 and a nut 25 is tightened against the top surface 102 of the biasing fastener.

To begin, a bolt 20 is placed through a bore hole 50 in the workpiece 22. The bolt 20 has a first end 52. Then either a first version or a second version of a third embodiment fastener 100 is placed onto the first end 52 of the bolt 20 until firmly seated against a first surface 30 of the workpiece 22. A nut 25 is then threaded onto the first end 52 of the bolt 20 until contacting at least a section of the top surface 102 of the biasing fastener 100. The biasing fastener 100 is then immobilized using a device such as, but not limited to, a tightening device including a first socket head and a second socket head. The first socket head engages the biasing fastener's 100 one or more side surfaces 106 and is fixed relative to the body of the tightening tool. The nut 25 is then tightened against the biasing fastener 100, thereby resiliently deforming the top and bottom surfaces 102 & 104 of the biasing fastener 100 and reducing the surfaces' respective convexity and concavity.

Figure 15:
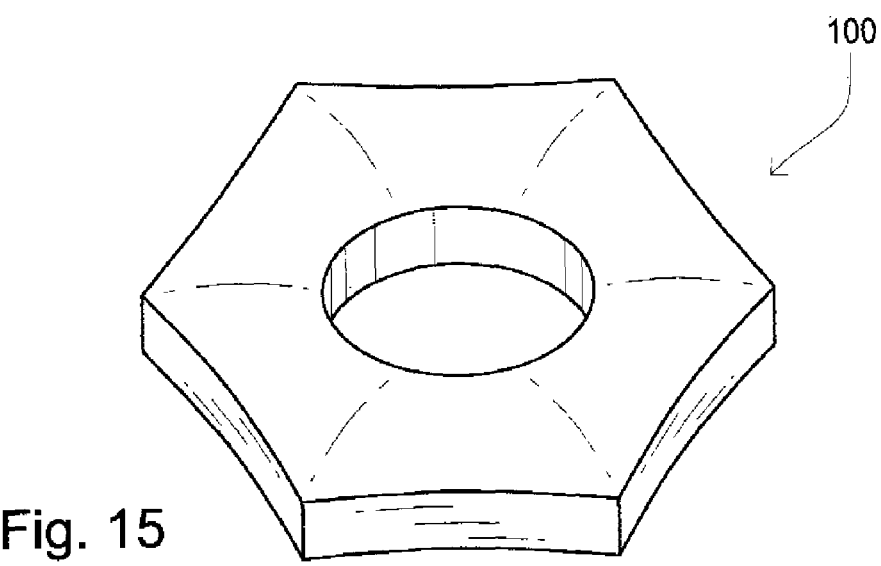
FIG. 15 is an isometric view of a second version biasing fastener (third embodiment) for providing a reaction point for a self-reacting tightening tool and creating a live load on the bolt according to one embodiment of the present invention.

The point protrusions 122 of the first embodiment dig into and/or grip the surface of the associated work piece and thereby prevent movement of the biasing fastener relative thereto. Additionally, the knurled portion of the top surface of one of the first versions of the third embodiment is adapted to stabilize the nut during tightening. The protrusions permit the self-reacting tool to react off of the workpiece through the biasing fastener. Other means of gripping the workpiece are contemplated other than the six protrusions illustrated in the associated Figures. For example, in a second version of the third embodiment, as best shown in FIG. 15, does not have pointed protrusions. In such an embodiment, the embodiment is kept substantially stable by the tips of the hexagon contacting at least one surface of the workpiece in such a manner that the tips permit the self-reacting tool to react off the fastener by creating a mechanical hindrance with the workpiece. In other variations, more protrusions can be distributed over the bottom surface of the fastener. In still other variations, a lower number of protrusions can be used.

A Method of Using a Fourth Embodiment to Create a Reaction Point When Using a Self Reacting Tightening Tool.

Figure 16:
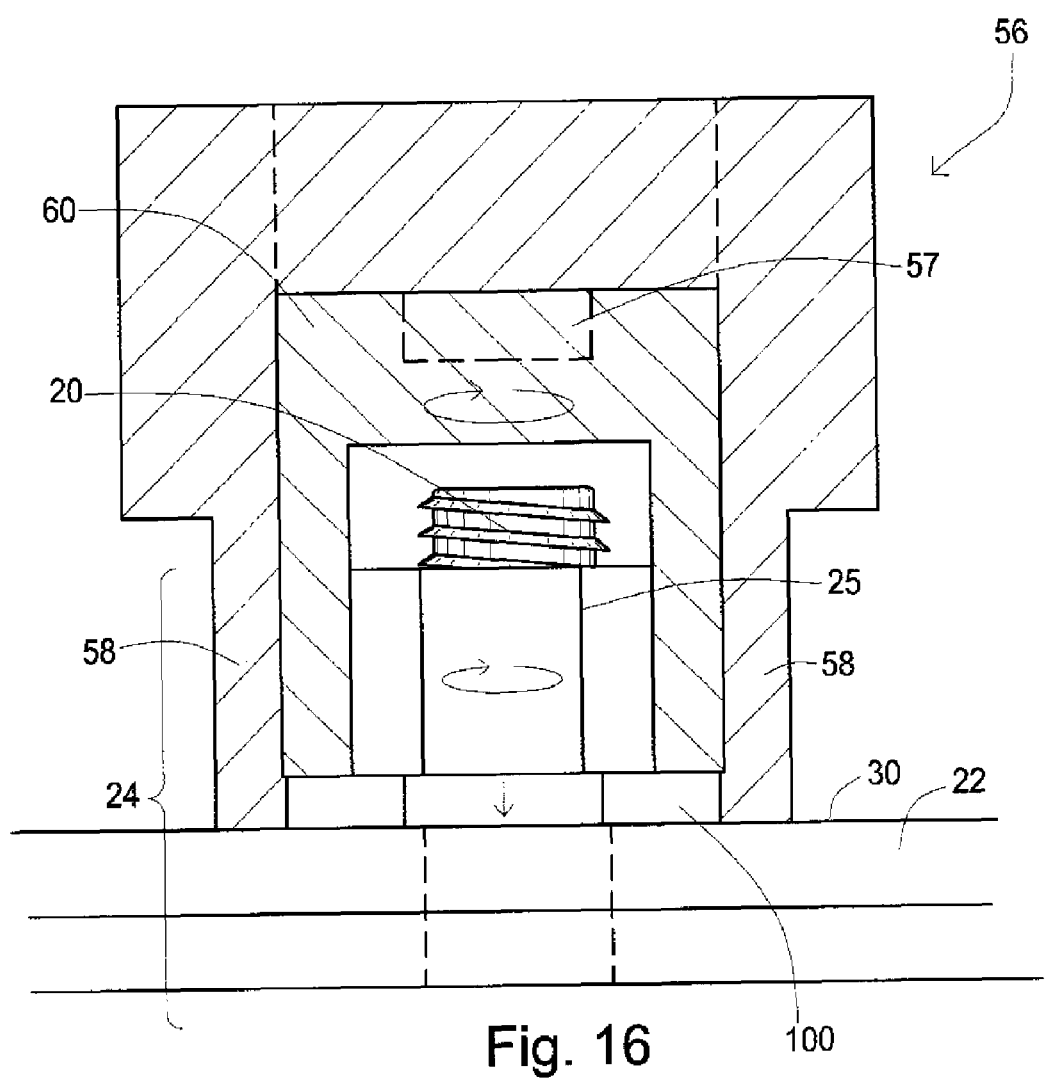
FIG. 16 is a cross-sectional side view of a self-reacting tightening tool engaged with a bolted workpiece assembly having a fastener (fourth embodiment) adapted to provide a reaction point for the self-reacting tightening tool according to one embodiment of the present invention.

Referring to FIGS. 13 and 16, a method of creating a reaction point for a self reacting tightening tool 56 by employing a fourth embodiment fastener is illustrated. Upon tightening of a nut 25 against a washer 100 being the fourth embodiment, friction is created between a bottom surface of the washer and a first surface 30 of the workpiece. The friction between the washer 100 and the workpiece prevents substantial rotational movement of the washer—even when the nut is rotating against the top surface 102. With friction keeping the washer substantially stable, upon engaging a first socket head 58 of a self reacting tightening tool with the washer, the first socket head reacts against the washer, keeping the first socket head substantially stable.

One method of creating a reaction point starts with placing a bolt 20 through a bore in a workpiece 22. The bolt may either have a bolt head or may have another way to keep the bolt from slipping out of the bore, such as, but not limited to, the bore being a threaded bore. After placing the bolt in the bore, the bolt is typically substantially stable at this juncture. At this point, a fourth embodiment 100 is placed over the bolt and a nut adapted to mate with the bolt is threaded onto the bolt until the nut contacts the top surface of the washer.

At this point in one method, a self reacting tightening tool 56 is placed onto the workpiece assembly such that an outer socket 58 substantially contacts the washer 100 and an inner socket 60 substantially contacts the nut 25. The inner socket typically has an inner notch 57 which is coupled to a tool drive mechanism adapted to rotate the inner socket. The outer socket is coupled to a substantially stationary portion of the tool, such as, but not limited to, a tool frame.

Upon placing the self reacting tightening tool 56 onto the inner and outer sockets, the tightening tool is powered on and the tool drive mechanism is engaged and begins to rotate. Upon rotation, the tool drive mechanism rotates the engaged inner socket, which, in turn, rotates the nut. The rotation is typically a clockwise direction in order for the nut to tighten against the fastener by traveling in a direction towards the washer.

Upon tightening the nut against the washer 100, the washer begins to be pressed against a first surface 30 of the workpiece 22. The nut 25, therefore, induces a compressive force onto the top surface 102 of the washer with the bottom surface of the washer inducing a compressive force onto the first surface 30 of the workpiece. As the nut is rotating against the top surface of the fastener, when the nut is substantially tight against the fastener, the rotational movement of the nut against the fastener also induces a rotational movement within the washer. However, the compressive force created by the bottom surface of the fastener on the workpiece is substantially equal and opposite of the rotational force and therefore keeps the washer in a substantially stable position relative to the nut and the bolt. Since, upon tightening of the nut 25 against the washer 100, the washer is substantially stable relative to the nut and bolt 20 due to the friction created between the washer and the workpiece, the washer may act as a reaction point for the first socket head, keeping the first socket head substantially stable.

Upon the second socket head completing its tightening of the nut onto the fastener, the drive mechanism is turned off and the two socket head are removed from the workpiece assembly Alternative Embodiments and Other Variations The embodiments of the washer as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure.

The first and second embodiments provide specific exemplary biasing fasteners that apply a live load and substantially eliminate or minimize torsional loading of the bolt between a bolt head or second end of the bolt (the portion that passes through the workpiece) and the fastener. It is appreciated that alternative means of elastically and resiliently stored energy are contemplated besides the radial cantilever spring of the first embodiment and the diaphragm spring of the second embodiment. Further, while the only means of interfacing with a wrench or self-reacting tightening tool shown in the Figures comprises hexagonally arranged side surfaces, it is appreciated that any other suitable means to firmly hold the fasteners are also contemplated.

Concerning the illustrated embodiments, the outer diameter of the biasing fastener and washer is shown as being essentially the same as an associated nut. It is to be appreciated that this is not necessarily the case The diameters of corresponding biasing fasteners, washers, and the nuts can vary. For example, the biasing fastener or washer can have a greater diameter than the nut. In such an instance for the first and second embodiments, the perimeter edge of the nut will contact the biasing fastener inwardly of the fastener's edge, but it is appreciated that the general functionality of the biasing fasteners will not typically be negatively impacted. It is appreciated that in certain circumstances the biasing fasteners or washers can also be smaller than the corresponding nut in diameter.

Unlike prior art biasing fasteners that comprise multiple parts that shear when certain loads are achieved, at least several of the various embodiments of biasing fasteners described herein are unitary comprising only a single piece. Further, because the live load is applied by the various embodiments by way of fastener resilient flexing, the fastener is not deformed or otherwise transformed during use thereby permitting its potential reuse.

We claim:

1. A method of creating a force on at least a portion of a workpiece assembly, the workpiece assembly including a self reacting tightening tool and having one or more bore holes extending therethrough, the method comprising:
   placing the bolt through a bore hole of the one or more bore holes, the bolt having a first end and a second end, the second end axially opposite the first end;
   selecting a biasing fastener based on a ratio of a thickness of the two or more side surfaces to an outer diameter of the biasing fastener is within the range of 0.050 to 0.200 whereby the ratio directly relates to an amount of load required to substantially flex or flatten the biasing fastener and an amount of live load that the biasing fastener can apply when substantially flexed or flattened;
   placing the biasing fastener onto the first end of the bolt against a workpiece first surface of the workpiece assembly, the biasing fastener having (i) a first surface and a second surface, wherein the first surface is convex and wherein the second surface is concave, (ii) two or more side surfaces extending between the first surface and the second surface, the two or more side surfaces being generally flat surfaces and adapted to receive the self reacting tightening tool preventing rotational movement between the biasing fastener and a portion of the self reacting tightening tool in direct contact with the biasing fastener, and (iii) an unthreaded bore having a bore axis, the bore axis being generally centered relative to at least one of the first surface and the second surface; and
   tightening a threaded nut onto the first end of the bolt over the biasing fastener using the self reacting tightening tool adapted to react off of the biasing fastener being held substantially rotationally fixed relative to the workpiece first surface by way of one or both of mechanical hindrance and friction whereby a live load is created between the bolt, the biasing fastener, and the threaded nut.

2. The method of claim 1, wherein said tightening the threaded nut onto the first end of the bolt over the biasing fastener includes:
   engaging a first socket head of the self reacting tightening tool over the biasing fastener, the first socket head being fixed relative to a body of the tool;
   engaging a second socket head of the self reacting tightening tool over the threaded nut; and
   applying a rotational force through the second socket head to the threaded nut.

3. The method of claim 2, wherein the two or more side surfaces of the biasing fastener comprises six side surfaces hexagonally arranged, the nut is hexagonally shaped, and the first and second socket heads comprise corresponding hexagonally shaped mating recesses.

4. The method of claim 1, wherein the second surface of the biasing fastener is substantially flat and planar after performing said tightening a threaded nut.

5. The method of claim 1, wherein the second surface of the biasing fastener comprises a plurality of points adapted to provide a mechanical hindrance to rotational movement.

6. The method of claim 1, wherein the first surface of the biasing fastener is substantially flat and planar after performing said tightening a threaded nut.

7. The method of claim 6 further comprising,
   removing the threaded nut from the first end of the bolt over the biasing fastener using the tool adapted to react off of the biasing fastener being held substantially rotationally fixed relative to the workpiece first surface by way of one or both of mechanical hindrance and friction, and
   removing the biasing fastener from the first end of the bolt wherein the first surface returns to a substantially convex shape and the second surface returns to a substantially concave shape thereby permitting its reuse in another workpiece assembly.

8. The method of claim 1, wherein the first surface of the biasing fastener is in contact with the workpiece first surface.

9. The method of claim 1, wherein the biasing fastener comprises a unitary piece being fabricated from a single piece of material.

10. The method of claim 9, wherein the single piece of material of the biasing fastener comprises high strength steel with an ISO strength rating of at least 8.8.

11. The method of claim 1, wherein the ratio of the thickness of the two or more side surfaces to the outer diameter of the biasing fastener is about 0.130.

12. The method of claim 11, wherein the biasing fastener does not include protrusions proximal the second surface whereby an outer portion of the second surface rests substantially flat against a flat adjacent surface prior to said tightening the threaded nut onto the first end of the bolt over the biasing fastener.

* * * * *